UNITED STATES PATENT OFFICE.

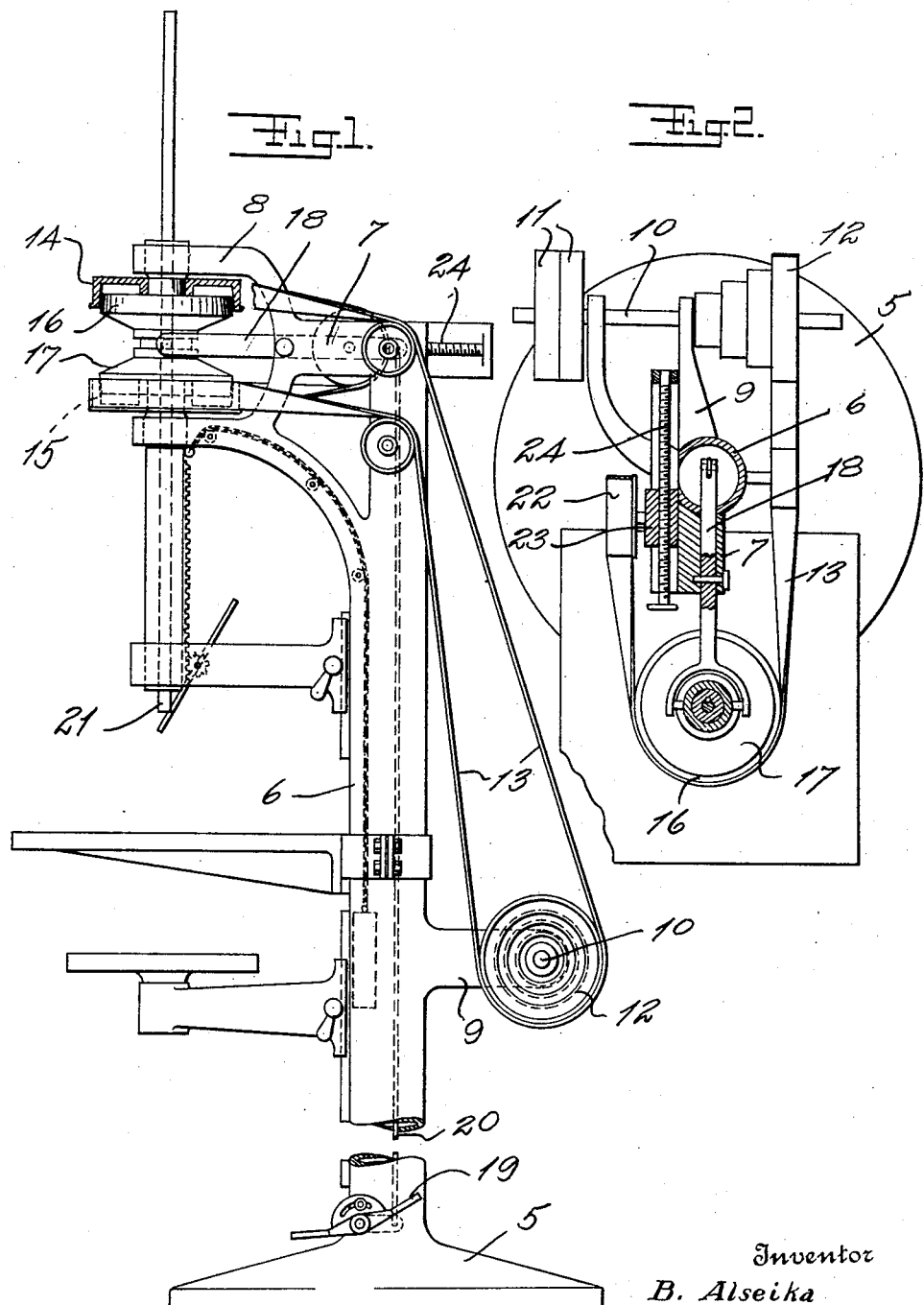

BENIS ALSEIKA, OF BRIGHTON, MASSACHUSETTS.

DRILLING MACHINE.

1,409,909.   Specification of Letters Patent.   Patented Mar. 21, 1922.

Application filed April 11, 1921. Serial No. 460,165.

*To all whom it may concern:*

Be it known that I, BENIS ALSEIKA, a citizen of Lithuania, residing at Brighton, in the county of Suffolk and State of Massachusetts, have invented certain new and useful Improvements in Drilling Machines, of which the following is a specification.

This invention relates to improvements in drill presses and has for its principal object to provide a means for retaining the driving belt under tension.

Another object of the invention is to provide an idler pulley over which the driving belt runs, which pulley is adapted to be adjusted to vary the tension on the belt.

With these and other objects the invention consists in the novel construction, combination and arrangement of parts, which will be fully set forth in the following specification, claimed and illustrated in the accompanying drawings in which:—

Figure 1 is a side view of a drill press equipped with this improved belt tightener.

Figure 2, is a top plan view of Figure 1 showing portions in section to more clearly illustrate the details of construction.

Referring to the drawings in detail, the numeral 5 designates the base of the device supporting a standard 6, the upper end of which is provided with a horizontally extending arm 7 which terminates in a U shaped yoke 8. A suitable rearwardly extending arm 9 projects from the standard intermediate its upper and lower ends and supports the drive shaft 10 on which the tight and loose pulleys 11 are mounted.

A suitable cone pulley 12 is arranged on the shaft 10 and traveling over said pulley is the drive belt 13, of the drill.

Rotatably mounted between the arms of the yoke 8 are the hollow conical clutch members 14 and 15, the outer faces of which act as pulleys over which the belt 13 runs. Co-operating with the clutch members 14 and 15, are the clutch members 16 and 17 respectively, which are adapted to be shifted by a suitable lever 18 which is pivoted to the bracket 7 near its forward end.

The shifting movements of the lever 18 are controlled by a foot pedal 19 which is connected to the rear end of the arm by a suitable rod 20 which extends through the standard as illustrated in the drawing.

It will thus be seen that by operating the foot pedal to shift the arm 18, either the clutch member 16 may be brought into engagement with the clutch member 14 to drive the drill shaft or by bringing the clutch member 17 into engagement with the clutch member 15, a reverse movement of the drill shaft may be had.

In order to keep the belt tight at all times an idler pulley 22 is mounted on a horizontally movable carriage 23 which moves in a plane parallel with the arm 7, and an adjusting screw 24 extends parallel to the arm 7 and through a screw threaded opening in the carriage 23. It will thus be seen that by turning the screw 24, the carriage may be moved rearwardly to tighten the belt, and should it be desired to change the speed of operation of the drill it will be obvious that the belt 13 may be shifted to the various diameters on the cone pulley and tightened by manipulation of the screw 24.

While in the foregoing there has been shown and described the preferred embodiment of this invention, it is to be understood that certain minor changes in the details of construction, combination and arrangement of parts may be resorted to without departing from the spirit and scope of the invention as claimed.

I claim—

1. The combination with a drill press having a pair of drill rotating pulleys and a belt arranged to drive said pulleys in opposite directions, of a cone pulley over which said belt is adapted to run whereby the speed of rotation of the drill operating pulleys may be varied, and an idler pulley for taking up the slack in said belt.

2. The combination with a drill press having a pair of drill rotating pulleys and a belt arranged to drive said pulleys in opposite directions, of a cone pulley over which said belt is adapted to run whereby the speed of rotation of the drill operating pulleys may be varied, an idler over which the belt is adapted to run, and means for adjusting the idler pulley to take up the slack in the belt.

3. A drill press comprising a standard, a pair of horizontally disposed, oppositely rotating, hollow clutch members near the upper end of the standard, a pair of cooperating clutch members arranged between the first mentioned clutch members and adapted to be selectively moved into contact therewith, a drill shaft adapted to be driven by the second mentioned clutch members, a belt adapted to run over the first mentioned clutch members whereby the same are driven, a conical driving pulley for said belt, an adjustable idler pulley for said belt, and means for adjusting the pulley to take up the slack in the belt.

In witness whereof I affix my signature.

BENIS ALSEIKA.